United States Patent
Reilly et al.

(10) Patent No.: US 7,095,025 B2
(45) Date of Patent: Aug. 22, 2006

(54) PROTECTIVE SHROUD FOR THERMAL IMAGING CAMERA MOUNTED TO PROTECTIVE HELMET

(75) Inventors: John J. Reilly, Bayside, NY (US); William L. Grilliot, Dayton, OH (US); Mary I. Grilliot, Dayton, OH (US); Patricia Lewis, Huber Heights, OH (US)

(73) Assignee: Morning Pride Manufacturing, L.L.C., Dayton, OH (US)

( * ) Notice: Subject to any disclaimer, the term of this patent is extended or adjusted under 35 U.S.C. 154(b) by 62 days.

(21) Appl. No.: 10/732,158

(22) Filed: Dec. 10, 2003

(65) Prior Publication Data

US 2005/0127296 A1    Jun. 16, 2005

(51) Int. Cl.
    *H01L 31/00* (2006.01)
(52) U.S. Cl. .......................................... 250/330; 29/103
(58) Field of Classification Search ................. 250/330, 250/333, 342, 353, 338.3; 359/350, 356; 2/6.6; D29/103
    See application file for complete search history.

(56) References Cited

U.S. PATENT DOCUMENTS

| | | | |
|---|---|---|---|
| 4,449,787 A * | 5/1984 | Burbo et al. | 313/524 |
| 4,536,892 A | 8/1985 | Brinkhoff et al. | |
| 4,961,626 A * | 10/1990 | Fournier et al. | 359/630 |
| 4,969,714 A * | 11/1990 | Fournier et al. | 359/630 |
| 5,089,914 A | 2/1992 | Prescott | |
| 5,805,120 A * | 9/1998 | Yamada et al. | 345/7 |
| 5,949,582 A * | 9/1999 | Coombs | 359/630 |
| 6,016,160 A | 1/2000 | Coombs et al. | |
| 6,023,288 A | 2/2000 | Coombs et al. | |
| 6,088,165 A * | 7/2000 | Janeczko et al. | 359/629 |
| 6,369,952 B1 * | 4/2002 | Rallison et al. | 359/630 |
| 6,456,261 B1 * | 9/2002 | Zhang | 345/8 |
| 6,476,391 B1 | 11/2002 | Zhang | |
| 6,606,114 B1 | 8/2003 | Gordon et al. | |
| 6,720,878 B1 * | 4/2004 | Jumpertz | 340/573.1 |
| 2003/0122958 A1 | 7/2003 | Olita et al. | |

* cited by examiner

*Primary Examiner*—David Porta
*Assistant Examiner*—Faye Boosalis
(74) *Attorney, Agent, or Firm*—Wood, Phillips, Katz, Clark & Mortimer

(57) ABSTRACT

In a combination wherein a thermal imaging camera having a front lens is mounted to a protective helmet, such as a firefighter's helmet, where the thermal imaging camera is not covered from above by any portion of the protective helmet, wherein a display is mounted below the front area of the brim, and wherein an arm connects the thermal imaging camera to the display, a shroud, which is aluminized so as to be heat-reflective, is adapted, when secured to the protective helmet, to cover the exposed top, side, and front surfaces of the thermal imaging camera, except for a front opening for the front lens and except for a bottom opening, through which the display and the arm connecting the thermal imaging camera to the display can pass when the shroud is being installed.

16 Claims, 1 Drawing Sheet

PROTECTIVE SHROUD FOR THERMAL IMAGING CAMERA MOUNTED TO PROTECTIVE HELMET

TECHNICAL FIELD OF THE INVENTION

This invention pertains to an improvement in a combination wherein a thermal imaging camera is mounted to a protective helmet, such as a protective helmet for a firefighter or for an emergency rescue worker, where the thermal imaging camera is not covered from above by any portion of the protective helmet.

BACKGROUND OF THE INVENTION

As exemplified in U.S. Pat. Nos. 5,089,914, 6,016,160, 6,023,288, 6,476,391, and 6,606,114 B1, and in U.S. Patent Application Publication No. US 2003/0122958 A1, it is known to mount a thermal imaging camera and an associated display (viewer) to a firefighter's helmet, so as to provide the firefighter with thermal images of fallen or trapped persons or of heat-radiating objects, who or which would be otherwise obscured, as by smoke.

As exemplified in U.S. Pat. Nos. 6,016,160, 6,023,288, and 6,606,114 B1, it is known to mount a thermal imaging camera and an associated display below a front area of a brim of a firefighter's helmet and to place the thermal imaging camera to one side of the firefighter's head, so as to protect the thermal imaging camera against falling objects and so as to place the thermal imaging camera in what is described as "an envelope of reduced heat" below the front area of the brim.

As exemplified in U.S. Patent Application Publication No. U.S. 2003/0122958 A1, the disclosure of which is incorporated by reference herein, it is known to mount a thermal imaging camera above a front area of a brim of a firefighter's helmet and to mount an associated display below the front brim. Therefore, advantageously, the thermal imaging camera provides the firefighter with a thermal image that is centered correctly, as compared to the thermal image provided to the firefighter by a thermal imaging camera placed to one side of the firefighter's head. However, disadvantageously, the thermal imaging camera is not protected by the front area of the brim of the firefighter's helmet, against direct impingement of thermal radiation, which may cause the thermal imaging camera to overheat.

SUMMARY OF THE INVENTION

This invention provides an improvement in a combination comprising a protective helmet and a thermal imaging camera having a front lens, the thermal imaging camera being mounted to the protective helmet, where the thermal imaging camera is not covered from above by any portion of the protective helmet. According to the improvement, the combination further comprises a protective shroud covering the exposed top, side, and front surfaces of the thermal imaging camera, except for a front opening for the front lens. This invention also provides, apart from a protective helmet and from a thermal imaging camera, a protective shroud useful in such a combination.

The protective shroud may be secured to the protective helmet. The shroud, which may be aluminized so as to be heat-reflective, may be thermally insulative. The shroud may have a bottom opening, through which an associated display (viewer) and an arm connecting the thermal imaging camera to the associated display can pass when the shroud is being installed. The bottom opening is not used and may be optionally omitted, a connecting arm is omitted, as when the thermal imaging camera and an associated display (viewer) are arranged to communicate wirelessly.

Although a protective shroud according to this invention is intended to be used with a protective helmet having a brim with a front portion, such as a firefighter's helmet conforming to the firefighter's helmet disclosed in U.S. Pat. No. 5,121,508, supra, this invention contemplates that a protective shroud according to this invention can be used, instead, with a protective helmet having a narrow brim or having no perceptible brim, such as a protective helmet for an oilfield worker or for a construction worker, a miner's helmet, or a military helmet.

DETAILED DESCRIPTION OF THE ILLUSTRATED EMBODIMENT

Figure 1:
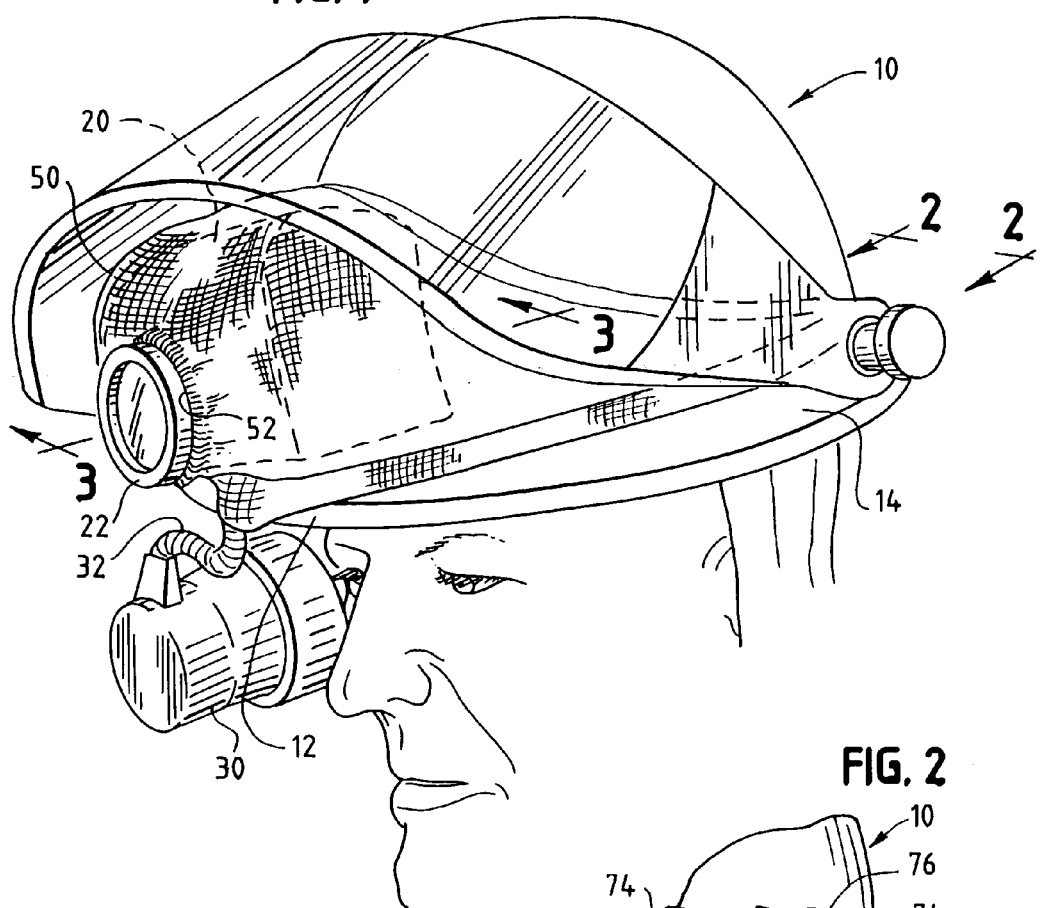
FIG. 1 is a perspective view of a combination embodying this invention and comprising a firefighter's helmet, a thermal imaging camera mounted to the firefighter's helmet, above a front area of a brim of the firefighter's helmet, and an aluminized shroud secured to the firefighter's helmet and covering top, side, and front surfaces of the thermal imaging camera, except for certain openings.
Figure 2:
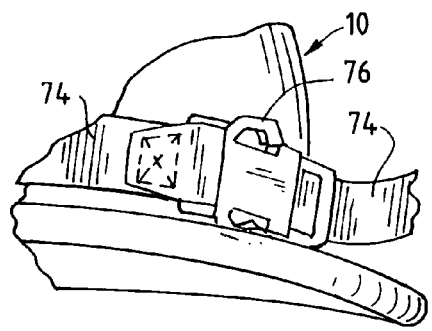
FIG. 2 and FIG. 3 are fragmentary, sectional details, as taken along section lines numbered similarly in FIG. 1, in directions indicated by arrows.
Figure 3:
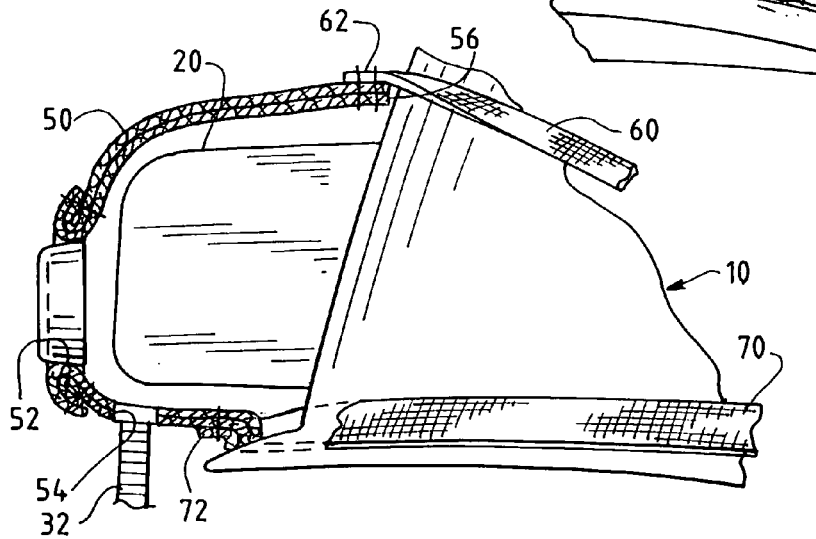

As illustrated in FIG. 1, a firefighter is wearing a firefighter's helmet 10, to which a thermal imaging camera 20 having a front lens 22 and an associated display (viewer) 30 connected to the thermal imaging camera 20 via a flexible arm 32 are mounted to the firefighter's helmet 10, above a front area 12 of a brim 14 of the firefighter's helmet, in a manner disclosed in U.S. Patent Application Publication No. US 2003/0122958 A1, supra, so as to be thus mounted to the firefighter's helmet 10 where the thermal imaging camera 20 is not covered from above by any portion of the firefighter's helmet 10. The firefighter's helmet 10 may conform to the firefighter's helmet disclosed in U.S. Pat. No. 5,121,508, the disclosure of which is incorporated by reference herein.

As illustrated and described in United States Patent Application Publication No. US 2003/0122858 A1, the disclosure of which has been incorporated by reference herein, the thermal imaging camera 20 comprises a protective housing, which contains an infrared camera assembly.

As contemplated by this invention, a protective shroud 50, which is secured to the firefighter's helmet 10, covers the exposed top, side, and front surfaces of the thermal imaging camera 20, except for a front opening 52, which is elasticized for a snug fit, for the front lens 22. Moreover, the protective shroud 50 covers bottom surfaces of the thermal imaging camera 20, except for a bottom opening 54, which is elasticized for a snug fit and through which the associated display 30 and the connecting arm 32 pass when the protective shroud 50 is installed by being pulled upwardly over the associated display 30, along the connecting arm 32, and backwardly over the thermal imaging camera 20. The protective shroud 50 has a back edge 56, which is elasticized for a snug fit. The bottom opening 54 is not used and may be optionally omitted, if the connecting arm 32 is omitted, as when the thermal imaging camera 20 and the associated display 30 are arranged to communicate wirelessly.

Preferably, the protective shroud 50 has plural fabric layers including one or more inner, possible quilted, thermally insulative layers and an outer layer, which is aluminized so as to be heat-reflective. As illustrated, the protective shroud 50 is secured to the firefighter's helmet 10 via an upper, elastic belt 60, which is sewn to the protective shroud 50, at a back seam 62, and a lower, fabric belt 70, which is sewn to the protective shroud 50, at a front seam 72, and which has two opposite ends 74 wrapped around the firefighter's helmet 10, above the brim 14, and buckled to each other, behind the firefighter's helmet 10, via a buckle 76, as illustrated, or via other means, such as hook-and-loop fasteners (e.g. Velcro™ fasteners).

Advantageously, the protective shroud 50 protects that thermal imaging camera 20 against being overheated by direct impingement of thermal radiation, even though the thermal imaging camera 20 is not mounted under the front area 12 of the brim 14 of the protective helmet 10.

The invention claimed is:

1. In a combination comprising a protective helmet and a thermal imaging camera, the protective helmet having a brim, the thermal imaging camera comprising a protective housing and being mounted to the protective helmet, above the brim, where the thermal imaging camera is not covered from above by any portion of the protective helmet, an improvement wherein the combination further comprises a protective shroud covering the exposed top, side, and front surfaces of the thermal imaging camera comprising the protective housing, except for a front opening for a front lens of the thermal imaging camera.

2. In a combination comprising a protective helmet and a thermal imaging camera, the protective helmet having a brim, the thermal imaging camera comprising a protective housing and being mounted to the protective helmet, above the brim, where the thermal imaging camera is not covered from above by any portion of the protective helmet, an improvement wherein the combination further comprises a protective shroud secured to the protective helmet, the protective shroud covering the exposed top, side, and front surfaces of the thermal imaging camera comprising the protective housing, except for a front opening for a front lens of the thermal imaging camera.

3. The improvement of claim 1 or 2, wherein the protective shroud is heat-reflective.

4. The improvement of claim 3, wherein the protective shroud is thermally insulative.

5. The improvement of claim 1 or 2, wherein the protective shroud is aluminized so as to be heat-reflective.

6. The improvement of claim 5, wherein the protective shroud is thermally insulative.

7. The improvement of claim 1 or 2, wherein the protective shroud is thermally insulative.

8. The improvement of claim 1 or 2, wherein the combination further comprises a display mounted below the thermal imaging camera and an arm connecting the thermal imaging camera to the display and wherein the shroud has a bottom opening, through which the display and the arm can pass when the protective shroud is being installed.

9. For a combination comprising a protective helmet and a thermal imaging camera having a front lens, the protective helmet having a brim, the thermal imaging camera comprising a protective housing being mounted to the protective helmet, above the brim, where the thermal imaging camera is not covered from above by any portion of the protective helmet, a protective shroud adapted to cover the exposed top, side, and front surfaces of the thermal imaging camera comprising the protective housing, except for a front opening for the front lens.

10. For a combination comprising a protective helmet and a thermal imaging camera having a front lens, the protective helmet having a brim, the thermal imaging camera comprising a protective housing and being mounted to the protective helmet, above the brim, where the thermal imaging camera is not covered from above by any portion of the protective helmet, a protective shroud adapted to be secured to the protective helmet and to cover the exposed top, side, and front surfaces of the thermal imaging camera comprising the protective housing, except for a front opening for the front lens.

11. The improvement of claim 9 or 10, wherein the protective shroud is heat-reflective.

12. The improvement of claim 11, wherein the protective shroud is thermally insulative.

13. The improvement of claim 9 or 10, wherein the protective shroud is aluminized so as to be heat-reflective.

14. The improvement of claim 13, wherein the protective shroud is thermally insulative.

15. The improvement of claim 9 or 10, wherein the protective shroud is thermally insulative.

16. The improvement of claim 9 or 10, wherein the shroud has a bottom opening, through which a display mounted below the thermal imaging camera and an arm connecting the thermal imaging camera to the display can pass when the protective shroud is being installed.

\* \* \* \* \*